R. F. PARKS.
CARD GAME.
APPLICATION FILED AUG. 13, 1919.

1,392,351.

Patented Oct. 4, 1921.
3 SHEETS—SHEET 1.

Inventor
Ray F. Parks
By Richard Brown,
Attorney

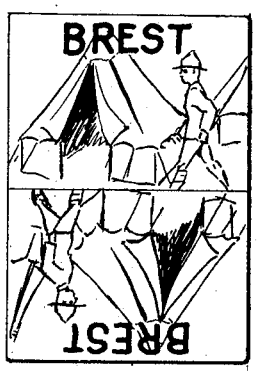
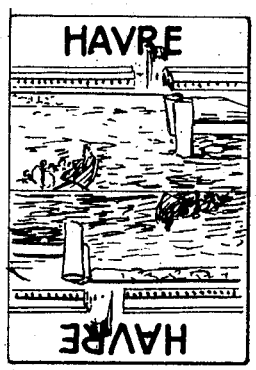
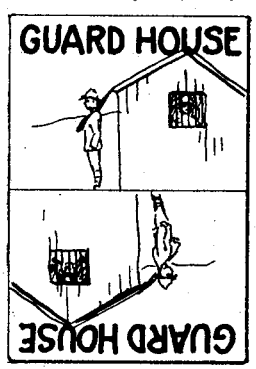
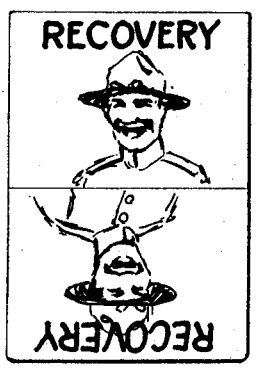

UNITED STATES PATENT OFFICE.

RAY F. PARKS, OF MELROSE, IOWA; W. E. PARKS, ADMINISTRATOR OF SAID RAY F. PARKS, DECEASED.

CARD GAME.

1,392,351.   Specification of Letters Patent.   Patented Oct. 4, 1921.

Application filed August 13, 1919. Serial No. 317,335.

*To all whom it may concern:*

Be it known that I, RAY F. PARKS, a citizen of the United States, residing at Melrose, in the county of Monroe and State of Iowa, have invented certain new and useful Improvements in Card Games, of which the following is a specification.

This invention relates to a game embodying a deck of cards to afford amusement and at the same time acquaintance with the incidents of the war between Germany and her allies and England, France, and the United States of America and their allies.

The game embodies a pack of cards generally ninety-six including cards representative of different stages of soldiering, places, incidents and conditions.

Referring to the accompanying drawings,

Figures 1, 2, 6 and 17 illustrate four cards representing four seaports in the United States.

Figs. 10, 11 and 21 illustrate three cards representing three seaports in France.

Figs. 12, 13, 18, 19, 20 and 23 illustrate five retarding cards for various causes which are indicated on the respective cards.

Fig. 14 represents the promotion card.

Figs. 15 and 16 illustrate two types of release cards representative of returning to action.

Figure 1:
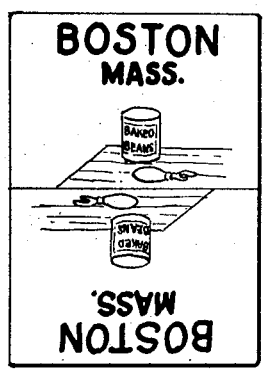
Figure 2:
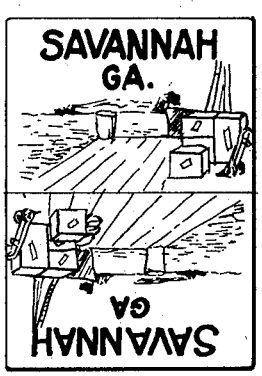
Figure 3:
Figs. 3, 4, 5, 7 and 8 illustrate five cards representing training camps in the United States.
Figure 4:
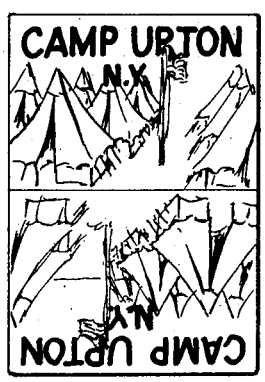
Figure 5:
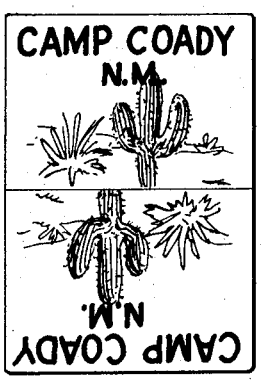
Figure 6:
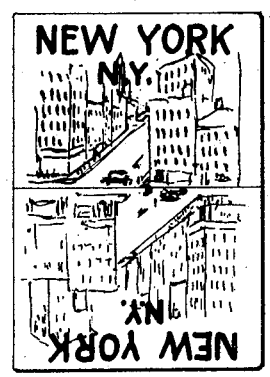
Figure 7:
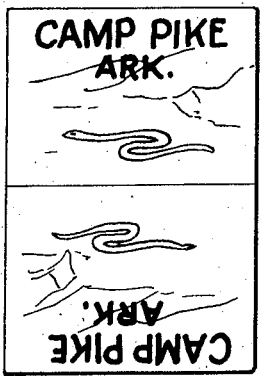
Figure 8:
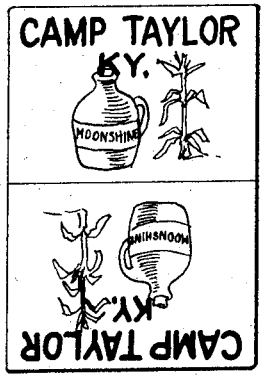
Figure 9:
Fig. 9 is a battle card.
Figure 18:
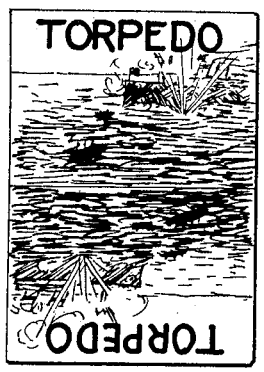
Figure 19:
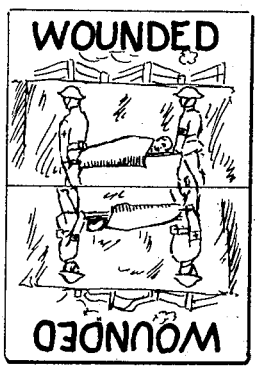
Figure 20:
Figure 21:
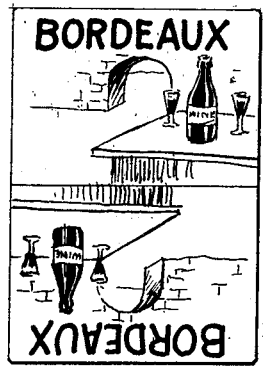
Figure 22:
Fig. 22 represents an out-of-action card.
Figure 23:
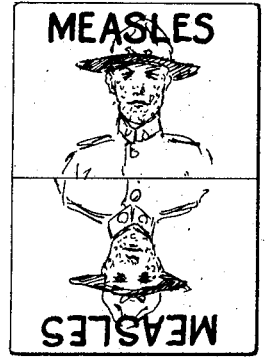
Figure 24:
Fig. 24 is the winning card.
Figure 25:
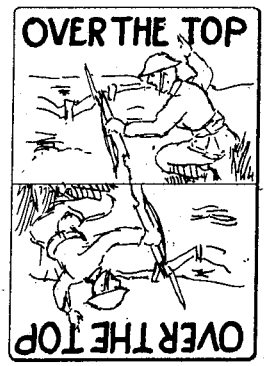
Fig. 25 represents an action card.

The game is designed for children and adults and may be played by two or six players and pictures the life of a soldier from the time he arrives in camp until he reaches his objective by playing a Can the Kaiser card or perishes in the attempt; and to show the things that may befall him both funny and otherwise in this time. The game is played with the aid of ninety-six cards pictured to show some of the training camps and seaports in the United States; the difficulty in crossing the ocean; the seaports in France; the different battles; the things that may happen, and four cards picturing the Kaiser. These cards are divided, briefly, into a main set or division; two collateral sets, and a Promotion card. The cards of the main set are subdivided into approximately five groups, the largest of which include the recruiting and training-camp cards, while the smallest is composed of the objective, or "Kaiser" card. The intermediate sets are formed by the seaport, over-the-top, and battle cards. The collateral sets are made up, respectively, of the retarding cards and the release cards, all of which are playable against the cards of the main sets and serve either to retard or aid the playing of the cards of such sets. The groups of the main sets are distinguished from each other by the character of the incidents in a soldier's life which they represent, such as, recruiting, training, transporting, active service, et cetera, and they are playable in succession according to the natural sequence of the events named. The deck is composed of the following cards: twenty training camp cards, which are used in starting the game and which are as follows: eight Camp Dodge cards, three Camp Pike, three Camp Cody, three Camp Taylor and three Camp Upton; eight United States seaports as follows: two New York, two Boston, two Savannah, two Norfolk; eight French seaports, as follows: three Brest, three Havre and two Bordeaux; eight battle cards, as follows: two Argonne-Forest, two St. Mihiel, two Belleau-Woods, two Chateau-Thierry; eight Over-the-Top cards; one Promotion card; four Can the Kaiser cards; twenty common release cards; five special release cards from Hun Prison or Guard-House, and the following delay cards: two Mumps, two Measles, two Gassed, two Torpedoed, two Wounded, two Guard-House, one Taken Prisoner and one Killed.

The game starts by dealing to each player five cards from the pack which has been thoroughly shuffled, and then using the remainder as a pile to draw from. The player to the left of the dealer starts the play by drawing one card from the reserve pile; if he then holds a Camp Dodge card he lays it on the table before him and thus starts on his way toward his objective of playing a Can the Kaiser card. Camp Dodge cards may be considered as representing a recruiting camp in contradistinction to the other four training camps and are the first of any cards to be played. If he does not possess this card he discards one and puts it in the salvage pile. The play then passes on to the next player who follows the same rule, and so on, until every player has drawn a card and discarded one. When discarded, such a card may sometimes be played upon the pile of an opponent rather than upon the salvage pile, to hinder the progress of the person against whom the discarded cards are played. The next card to get is a training Camp card, which when secured is laid on top of the Camp Dodge card; next a United States seaport card, then a French seaport, after which an Over-the-Top card is needed before a player can put down a Battle card, after the Battle card he is ready to play a Can the Kaiser card. The stop or delay cards are played on the pile of another player and hinder the progress only of the person on whom they are played. A Mumps, Measles or Guard-House are delay cards which may be played at any stage of the game; a Torpedoed card only when the player has laid down a United States seaport card and has not yet played a French seaport card, while a Gassed, Wounded or Taken Prisoner card may be played only after the player on which it is played has played a Battle card and an Over-the-Top card. The Killed in Action card is played similar to the last three cards named but puts the player out of the game. The promotion card may be played at any time and entitles the player playing it on his own pile to make two more plays. A release card must be played by the player having a stop card played on his pile, this entitles him to proceed with the game, but if the stop card is a Torpedoed card he must get another seaport card after being released before he can continue the game. A common release or recovery card is sufficient to nullify any stop card with the exception of a Taken Prisoner or a Guard House card. These require a special or Release from Hun Prison or Guard House card. If the stop card is Wounded, Gassed or Taken Prisoner he must after being relased then secure and play an Over-the-Top and a Battle card before he can continue.

The player who can survive all delays, etc.. and plays a Can the Kaiser card wins the game.

Let each player remember that no player can hold more than five cards at one time and that no more than one stop card can be played upon a player at one time. If the reserve pack is exhausted before the game is finished then the salvage pile, together with each individual pile is shuffled and used as a reserve pile, each player retaining the top card on his pile. This game may be played by using two or more decks and playing partners at two or more tables.

Having thus fully described my invention, what I claim as new and desire to secure by Letters Patent is:—

1. A card game of the character specified comprising a pack of which the cards are divided into: a main set, subdivided into separate card groups one of which contains the objective or "Kaiser" card, while the other groups are distinguishably representative of events leading up to the attainment of such objective, said groups being playable in succession according to the natural sequence of the events indicated; a set of delay cards for interrupting the play of the main set, such delay cards being distinguishably representative of difficulties or incidents attendant upon the events indicated by the cards of the main set and having a retarding playing value with reference to the unit of such set; and a set of release cards playable in succession to the cards of the delay set, said release cards being distinguishably representative of events counteractive to the delay incidents and having a playing value counteracting or neutralizing the adverse value or effect of the delay unit.

2. A card game comprising a pack including a plurality of card groups, distinguishably representative of successively occurring events in a soldier's life, and having, in play, precedence over one another according to the natural sequence or occurrence of the events, a card of one set being playable after a card of a precedent set; a set of delay cards for interrupting the play of the card groups, said delay set including special units having a retarding value only with reference to certain predetermined groups and playable consecutively to such groups; and a set of release cards having a value, in play, neutralizing the adverse value or retarding effect of the delay cards, said release set including special units neutralizing the retarding effect of the said special delay unit.

3. A card game of the character specified comprising a pack of which the cards are divided into: a main set, subdivided into separate groups, one of which constitutes the objective, or "Kaiser" card, while the other groups are distinguishably representative of events leading up to the attainment of such objective, said groups being playable in succession according to the natural sequence of the events indicated; a delay set, of which the cards have a value, in play, adverse to the playing values of the cards of the main set, certain cards of the delay set being playable according to the natural sequence of events designated thereon and only in succession to cards of a given group and serving to retard the play of cards of a group succeeding the one played upon; a set of release cards, neutralizing the adverse value or effect of the delay cards, and including cards playable in succession to, and affecting only, certain predetermined cards of the delay set; distinguished by the designations thereon showing the events brought in sequence; and a promotion card having, in play, a value superior to every other card, and playable upon the cards of any set.

In testimony whereof I affix my signature in presence of two witnesses.

RAY F. PARKS.

Witnesses:
E. L. FORD,
PAT CARR.